United States Patent
Huang et al.

(10) Patent No.: US 7,409,258 B2
(45) Date of Patent: Aug. 5, 2008

(54) METHOD AND SYSTEM FOR MEASURING CUSTOMER DELIVERY SERVICE

(75) Inventors: Shih-Heng Huang, Hsinchu (TW);
Kuo-Lien Chen, Hsinchu (TW);
Chin-Hui Hung, Hsinchu (TW); Andy Hong, Hsin-Chu (TW); Cheng Meng, Hsinchu (TW); Cheng-Chung Chien, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 11/682,685

(22) Filed: Mar. 6, 2007

(65) Prior Publication Data
US 2007/0255606 A1    Nov. 1, 2007

Related U.S. Application Data

(60) Provisional application No. 60/795,754, filed on Apr. 28, 2006.

(51) Int. Cl.
*G06F 19/00*    (2006.01)

(52) U.S. Cl. ............... 700/102; 700/120; 705/28
(58) Field of Classification Search ............ 700/97, 700/100, 102, 120; 705/1, 28
See application file for complete search history.

(56) References Cited

U.S. PATENT DOCUMENTS

| 5,819,232 | A * | 10/1998 | Shipman ................ 705/8 |
| 7,039,481 | B2 * | 5/2006 | Kawase et al. ............ 700/99 |
| 7,218,980 | B1 * | 5/2007 | Orshansky et al. ........ 700/99 |
| 2003/0195648 | A1 * | 10/2003 | Bacin et al. ............ 700/100 |
| 2005/0288986 | A1 * | 12/2005 | Barts et al. ............ 705/9 |

* cited by examiner

Primary Examiner—Albert DeCady
Assistant Examiner—Douglas S Lee
(74) Attorney, Agent, or Firm—Haynes Boone, LLP

(57) ABSTRACT

Disclosed is a method and a system for measuring customer delivery service. A projected customer delivery date is generated. At least one projected output volume is determined based on the projected customer delivery date. At least one actual output volume is determined, and an accuracy of the projected customer delivery date is determined based on the at least one projected output volume and the at least one actual output volume.

19 Claims, 20 Drawing Sheets

10

$$DSA\_by\_part(i) = \frac{\text{Min}(POV_i, AOV_i)}{\text{Max}(POV_i, AOV_i)}$$

52

Figure 5A $$DSA = \frac{\sum_i \text{Min}(POV_i, AOV_i)}{\sum_i \text{Max}(POV_i, AOV_i)}$$

| Part Name | AO ∇ | PO ∇ | DSA |
|---|---|---|---|
| TMA123 | 100 | 80 | 80/100=80% |
| TMB456 | 40 | 50 | 40/50=80% |
| TMC789 | 50 | 30 | 30/50=60% |
| Overall | 190 | 160 | (80+40+30)/(100+50+50)<br>=75% |

METHOD AND SYSTEM FOR MEASURING CUSTOMER DELIVERY SERVICE

CROSS-REFERENCE

This application claims priority to U.S. Patent Application Ser. No. 60/795,754 filed on Apr. 28, 2006 which is hereby incorporated by reference.

BACKGROUND

The present disclosure relates in general to semiconductor manufacturing, and more particularly, to a system and method to accurately measure customer delivery service in manufacturing of integrated circuits.

In semiconductor manufacturing technology, customer delivery service may be measured by the accuracy of a customer delivery schedule. To determine the accuracy of the customer delivery schedule, a method based on a committed line item performance may be used. For each line item, this method identifies a delivery date for a volume of semiconductor product. If, for example, 90 percent of the semiconductor product is shipped by the delivery date, the delivery schedule is considered to have been accurate.

However, this method provides only a conservative forecast. Customers need a more accurate projected output date to reduce their inventory and consequent capacity costs. In addition, no lead time is given to the production control department ahead of the confirmation date of delivery, such that product capacity may be adjusted and outsourcing costs may be reduced.

Therefore, a need exists for a method and system for measuring customer delivery service more accurately, such that a better forecast of customer delivery and early communication to the customers and production control may be provided.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. It is also emphasized that the drawings appended illustrate only typical embodiments of this invention and are therefore not to be considered limiting in scope, for the invention may apply equally well to other embodiments.

FIG. 5A is a diagram illustrating an exemplary formula used to calculate weekly DSA score by device's volume.

FIG. 5B is a diagram illustrating an exemplary formula used to calculate weekly DSA score by total volume.

FIG. 6 is a diagram illustrating an exemplary calculation of a weekly DSA score by total volume.

DETAILED DESCRIPTION

Figure 1:
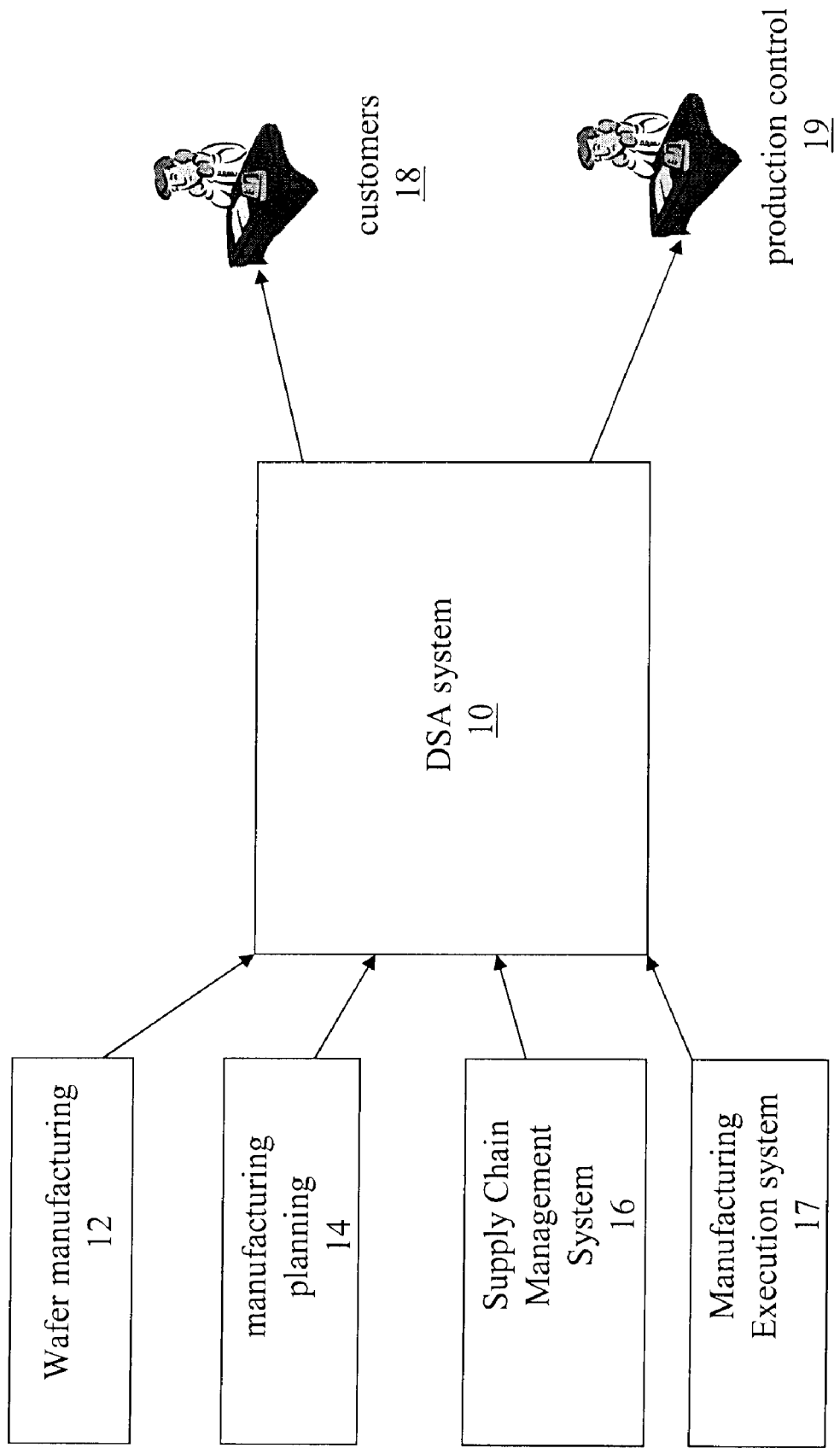
FIG. 1 is a diagram illustrating a delivery schedule accuracy system.

For the purposes of promoting an understanding of the principles of the invention, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Furthermore, the depiction of one or more elements in close proximity to each other does not otherwise preclude the existence of intervening elements. Also, reference numbers may be repeated throughout the embodiments, and this does not by itself indicate a requirement that features of one embodiment apply to another embodiment, even if they share the same reference number.

Aspects of the present disclosure provide a method and system for providing better forecast of customer delivery and communication to the customers. In an illustrative embodiment, a daily projected output date is generated based on information from wafer manufacturing, manufacturing planning, and supply chain management system. The projected output date is accessible by the customers. A weekly projected output volume is generated based on the projected output date. An actual output volume is used in conjunction with the projected output volume to provide a delivery schedule accuracy (DSA) score. DSA is an index used to measure the accuracy of the projected output date (POD) by volume or device. DSA may be calculated on a daily or weekly basis.

Referring to FIG. 1, delivery schedule accuracy system 10 generates a projected output date (POD) based on information from three parts: capabilities of the production facilities from wafer manufacturing department 12, a daily operation plan of the manufacturing planning 14, and a master production schedule of the supply chain management system 16. POD indicates a projected date of delivery to the customer based on production volume or device. A projected output volume (POV) is then determined based on the POD 12. POV indicates a projected volume for delivery to the customer based on a POD or device. An actual output volume (AOV) is also determined based on production volume measured from production equipments via the manufacturing execution system (MES) 17. AOV indicates an actual output volume for delivery to the customer based on a device or POD. The DSA system 10 then provides the generated POD along with other data to customers 18. The DSA system 10 also generates a DSA score and provides the score to production control 19 for review. Production control 19 may adjust production volume based on the DSA score.

Figure 2:
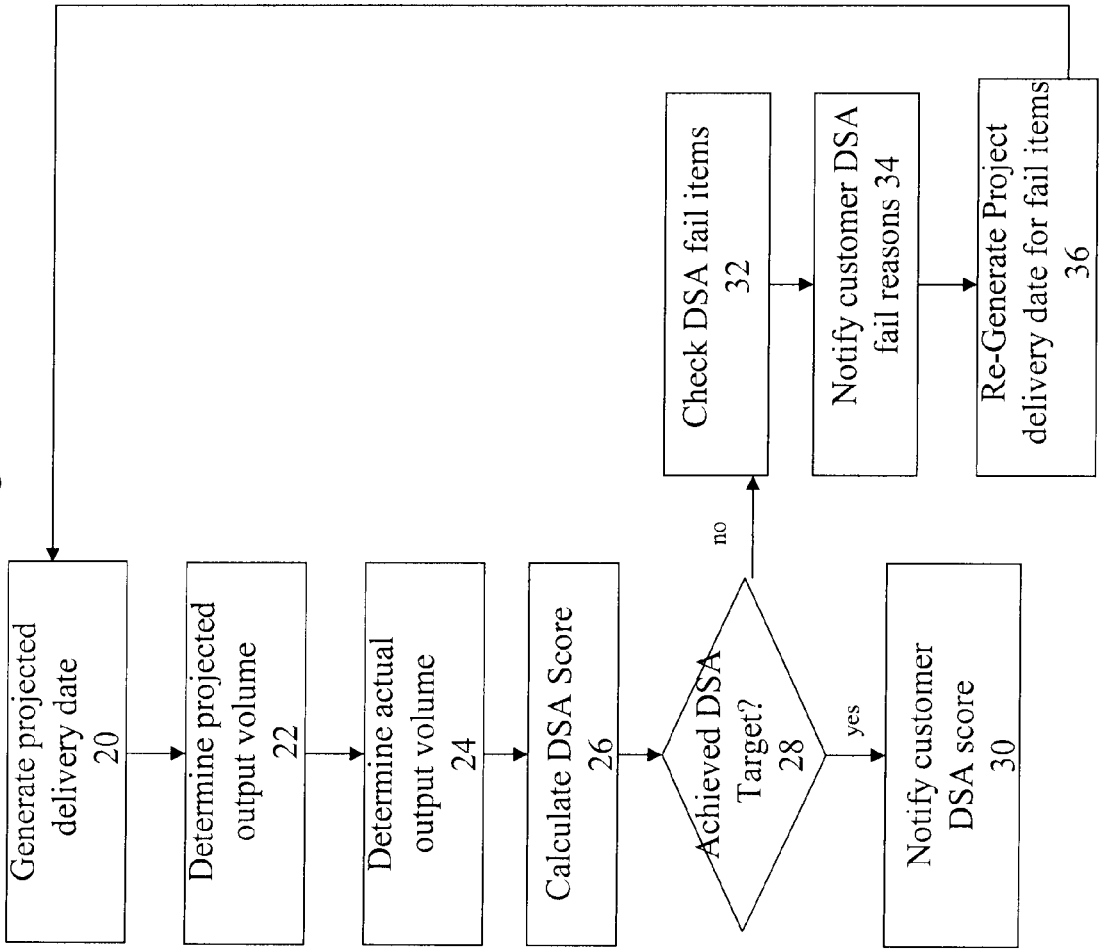
FIG. 2 is a flowchart of an exemplary process for measuring customer service delivery by the DSA system.

Referring to FIG. 2, an exemplary process for measuring customer service delivery by the DSA system 10 begins at step 20, where a projected output delivery date (POD) is generated on a daily basis. Next, at step 22, a projected output volume is determined based on the projected output delivery date. At step 24, an actual output volume is determined. A DSA score is then calculated at step 26. A determination is then made at step 28 as to whether the DSA target is achieved based on the projected output volume and the actual output volume. If the DSA target is achieved, the customer is notified of the DSA score at step 30. If the DSA target is not achieved at step 28, the DSA system checks the DSA fail items at step 32 and notifies the customer reasons for DSA failure at step 34. A projected output delivery date is re-generated for the failed items at step 36 and the process then returns to step 20 to generate a projected delivery date.

Figure 3:
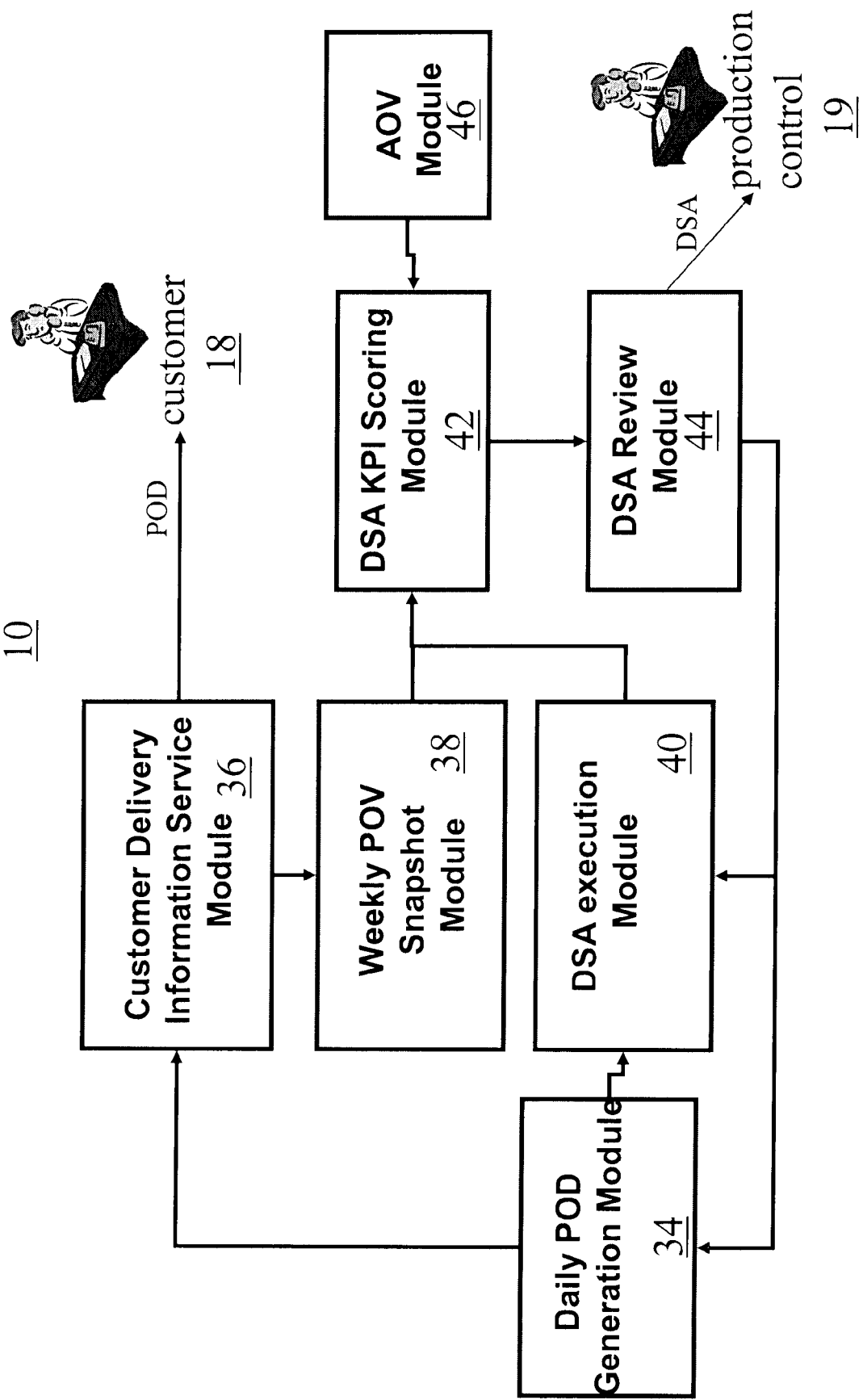
FIG. 3 is a diagram illustrating components of a delivery schedule accuracy system.

Referring to FIG. 3, in an illustrative embodiment, delivery schedule accuracy (DSA) system 10 comprises a daily projected output date generation module 34 that generates a projected output date (POD) on a daily basis. In operation, a daily operation work plan is generated by an enterprise planning department (EMP) based on a master production schedule. The master production schedule may be prepared by the manufacturing planners of the wafer manufacturing department (MFG). In addition to the master production schedule, capabilities of the production facilitates from wafer manufacturing are used to generate the daily operation work plan. The daily operation work plan includes a projected output date (POD) for all production wafers including those that fail to catch up with the master production schedule.

Once a projected output date (POD) is generated, the POD and other data are sent to a customer delivery information service module 36. In one embodiment, the customer delivery information service module 36 may be implemented as a manufacturing Website accessible by the customers. The customer delivery information service module 36 provides early communication of information to the customers 18. The information includes POD categorized by device, volume, and date. The customers 18 may be notified by email, FTP, or via the Web. In this way, early communication may be provided to the customers 18 as new POD is generated.

Based on the projected output date (POD), a weekly snapshot of the projected output volume (POV) is taken by a weekly POV snapshot module 38. The weekly POV snapshot is taken based on information provided by the wafer manufacturing department (MFG) via the enterprise planning department system (EMP), and the enterprise supply chain management system (ESCM). The ESCM provides fast and accurate response to the customer's demand or order changes based on three processes: customer demands to support, orders to confirm, and orders to ship. In addition to a weekly POV snapshot, a daily POV snapshot may also be taken by the POV snapshot module 38.

Based on the weekly/daily projected output volume (POV), a DSA execution module 40 is executed by the wafer manufacturing department (MFG) and the circuit probe testing department (CP). The wafer manufacturing department (MFG) dispatches instructions to production equipments in the manufacturing execution system (MES) in order to meet the weekly/daily POV. The DSA execution module 40 dispatches instructions to speed up or slow down the manufacturing processes in order to meet the weekly/daily POV. Circuit probe test department (CP) performs functional testing on the production wafers based on the weekly/daily POV.

Once the weekly POV snapshot is taken and the DSA execution module dispatches instructions to manufacturing, a DSA KPI scoring module 42 then compares the POV from the weekly POV snapshot module 38 with an actual output volume (AOV) provided by the AOV module 46 to generate a DSA score. The DSA score indicates the accuracy of the POD on a weekly or daily basis. The AOV module 46 collects production data from the production equipments via the manufacturing execution system (MES) and generates an actual output volume based on a device or a date. The generated DSA score is then sent to a DSA review module 44, which reviews the DSA score and stores the DSA information in a business intelligent data warehouse (BIDW). The DSA review module 44 also notifies the wafer manufacturing department (MFG) and the production control department (PC) 19 if an adjustment to the manufacturing process is required based on the DSA score. For example, notification may be sent to the DSA execution module 40 to adjust parameters of the production dispatching system to speed up or slow down production. In this way, the production control department 19 may adjust their backend capacity to accommodate for the latest DSA forecast.

Figure 4:
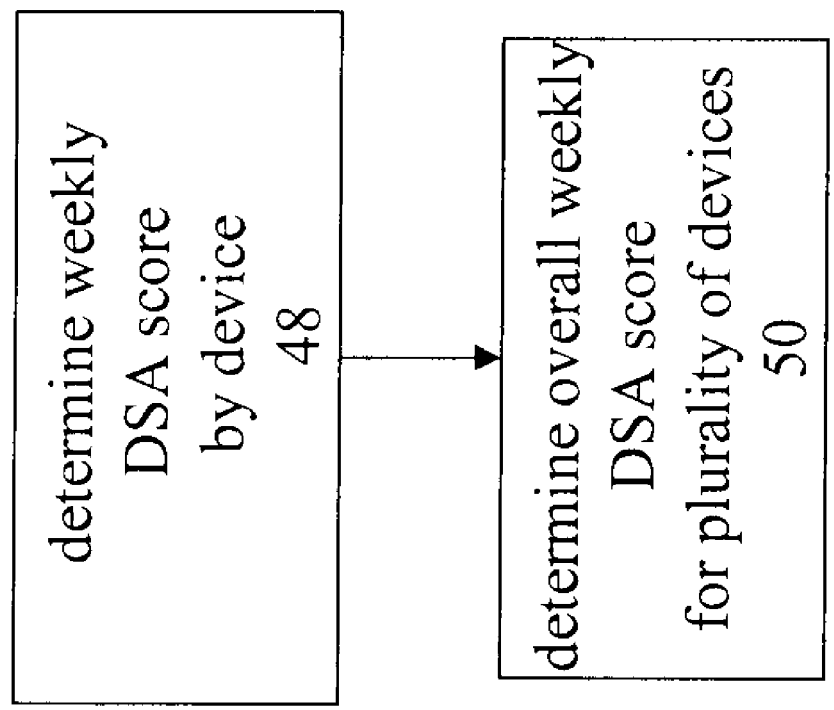
FIG. 4 is a flowchart of one exemplary process for determining accuracy of the projected output delivery date.

Referring to FIG. 4, an exemplary process for determining accuracy of the projected output delivery date begins at step 48, where a weekly DSA score is determined by device or volume. Next, an overall weekly DSA score may be determined for a plurality of devices based on the weekly DSA score by device or volume.

Referring to FIG. 5A, a DSA score by device's volume is determined by DSA scoring module 42 using formula 52. The DSA score is used to align customer order confirmation on a weekly basis. For example, a one week DSA forecast may be generated encompassing volume that is produced from 7 am of this Friday morning to 7 am of next Friday morning. In addition to a one week DSA forecast, other cumulative DSA forecast, including a 2-week, a 3-week DSA forecast, may also be generated without departing the spirit and scope of the present disclosure.

In formula 52, a minimum of the projected output volume (POV) per week and the actual output volume (AOV) per week for a device i is first determined. The POV per week is provided by the weekly POV snapshot module 38. The AOV per week is provided by AOV module 46. The minimum is then divided by a maximum of the projected output volume (POV) per week and the actual output volume (AOV) per week for the device i to generate a DSA score. For example, the projected output volume for device TMA 123 is 80 wafers per week and the actual output volume for device TMA 123 is 100 wafers per week. The minimum of the projected output volume and the actual output volume for the device, in this case 80, is divided by 100, which is a maximum of the projected output volume and the actual output volume for the device. The resulting DSA score is 80/100 or 80%.

Referring to FIG. 5B, a DSA score by total volume is determined by DSA scoring module 42 using formula 54. In formula 54, a summation of the minimums of the projected output volume and the actual output volume of all the devices is determined. The POV per week is provided by the weekly POV snapshot module 38. The AOV per week is provided by AOV module 46. A summation of the maximums of the projected output volume and the actual output volume of all the devices is then determined. The summation of the minimums is divided by the summation of the maximums to generate a DSA score by volume.

Referring to FIG. 6, a summation of minimums of the projected output volume and the actual output volume of all the devices is first determined. In this example, the minimums of devices TMA 123, TMB 456, and TMC 789 are 80, 40, and 30, respectively. The summation of the minimums is 80+40+ 30, which equals to 150. A summation of maximums of the projected output volume and the actual output volume of all the devices is then determined. In this example, the maximums of devices TMA 123, TMB 456, and TMC 789 are 100, 50, and 50, respectively. The summation of the minimums is 100+50+50, which equals to 200. The summation of the minimums is divided by the summation of the maximums to generate a DSA score by volume. In this example, the summation of minimums, 150, is divided by the summation of the maximums, 200, which generates a DSA score of 75%. This means that the one week forecast of the projected out date (POD) is 75% accurate based on the volume.

Figure 7:
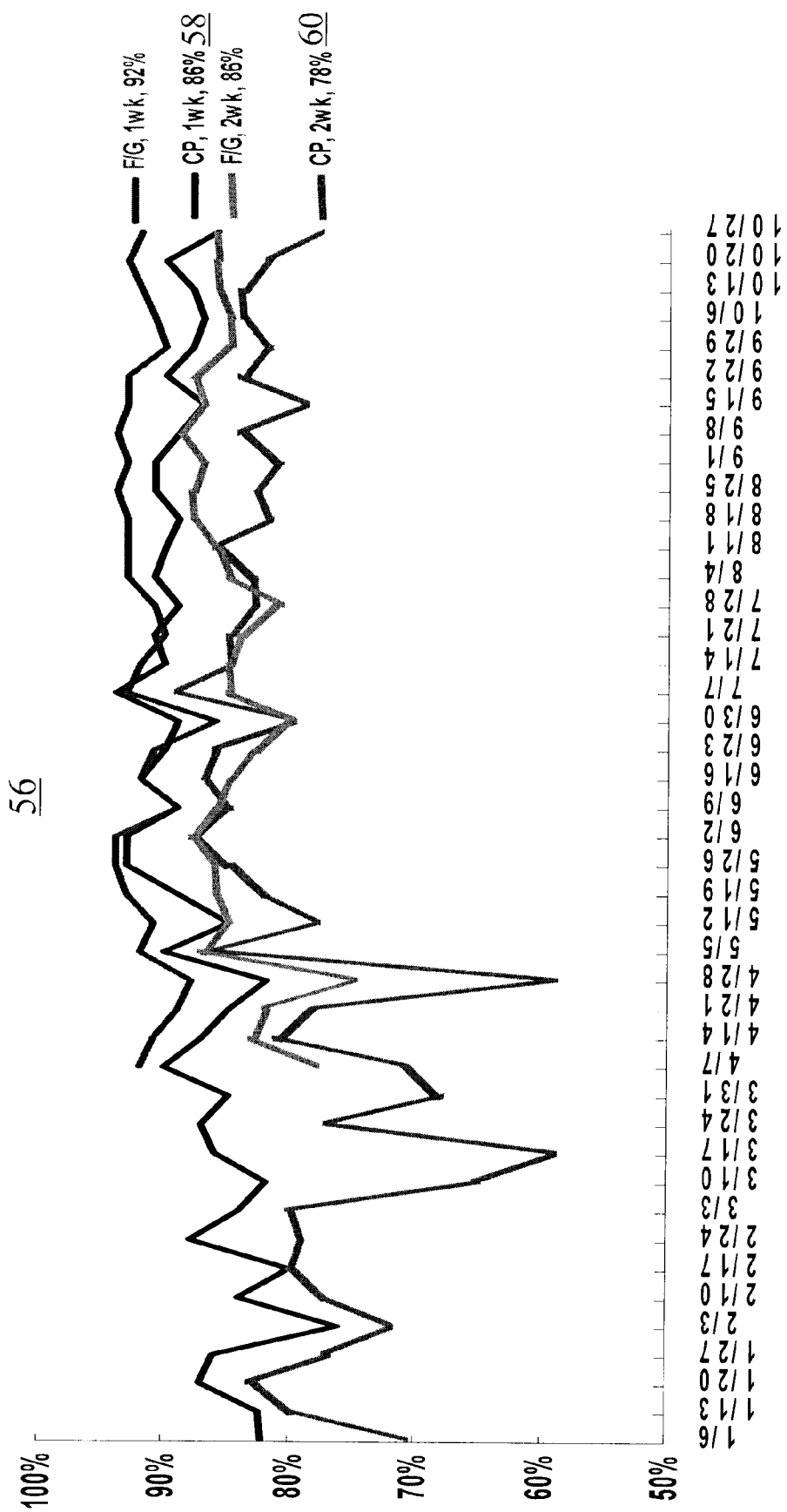
FIG. 7 is a graph of exemplary DSA scores based on a one week and a two week forecast by different IC service flows.

Referring to FIG. 7, graph 56 comprises a Y-axis that indicates DSA scores by different IC service flows. The Graph 56 also comprises a X-axis that indicates weekly dates. In this example, the one week DSA score 58 for circuit probe testing is 86% and the two week DSA score 60 for circuit probe testing is 78%. This means that, in this example, the accuracy of the two week forecast is less than the accuracy of the one week forecast.

Figure 8:
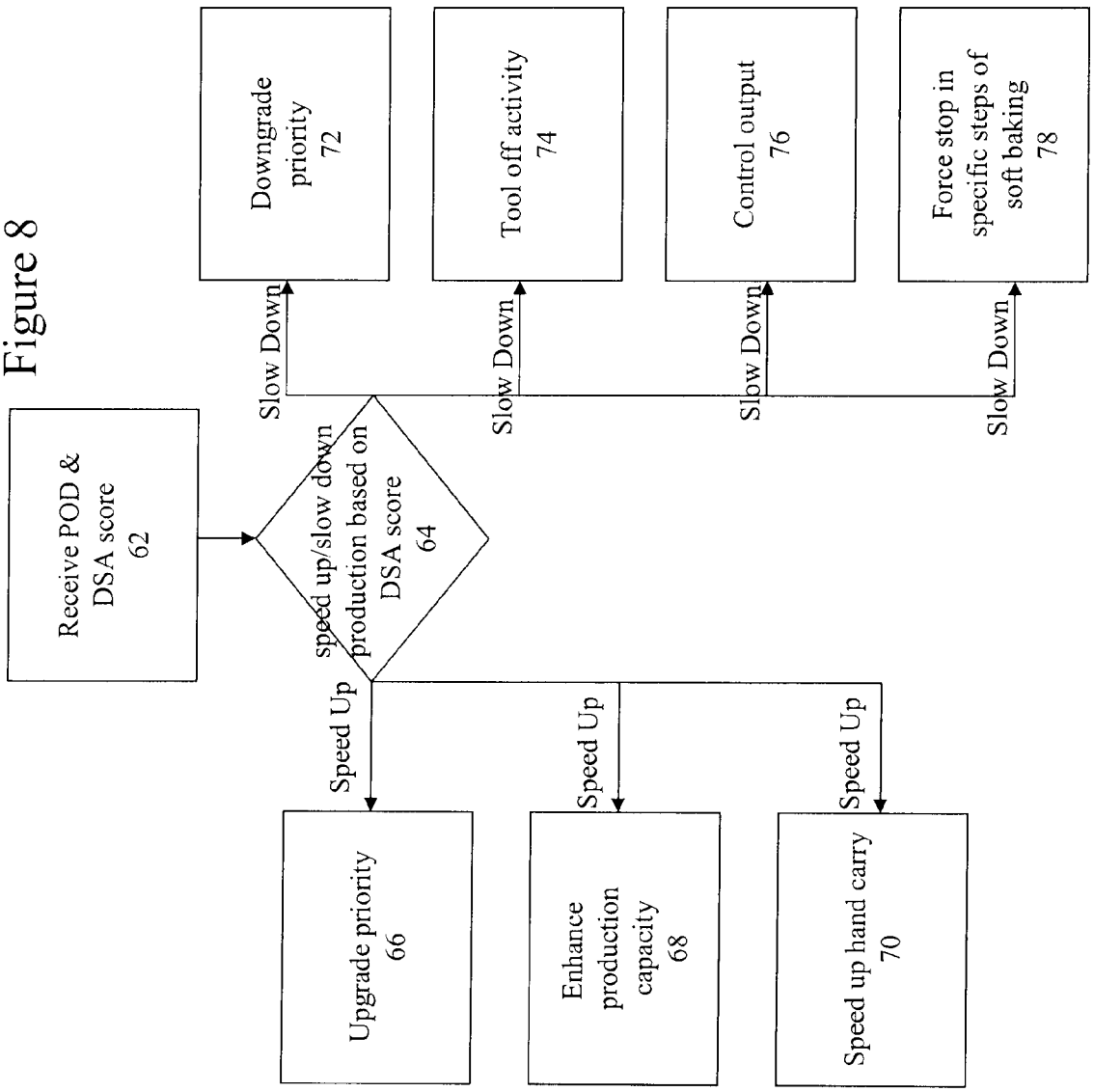
FIG. 8 is a flow diagram of an exemplary speed control performed by the DSA execution module.

As discussed above, the DSA execution module 40 dispatches instructions to speed up or slow down the manufacturing processes in order to meet the POV. Referring to FIG. 8, a flow diagram of an exemplary speed control process performed by the DSA execution module 40 is depicted. The process begins at step 62, where the DSA execution module 40 receives the weekly projected output volume (POV) and the DSA score from the DSA review module 42.

At step 64, a determination is made by the DSA execution module 40 as to whether to speed up or slow down production. The determination is made based on the DSA score. For example, if the DSA score is close to 100% in a two week forecast, the DSA execution module may slow down production. However, if the DSA score is not close to 100% in a one week forecast, the DSA execution module may speed up production to meet the POV.

If DSA execution module 64 determines to speed up production, the DSA execution module 40 may perform a number of steps to speed up production. For example, at step 66, the DSA execution module 40 may upgrade the priority of production by device or volume using an automatic priority setting mechanism. Alternatively, at step 68, the DSA execution module 40 may enhance production capacity. Also, at step 70, DSA execution module 40 may speed up hand carry operations performed by operators.

If DSA execution module 40 determines to slow down production, the DSA execution module 40 may perform a number of steps to slow down production. For example, at step 72, DSA execution module 40 may downgrade the priority of production by device or volume using an automatic priority setting mechanism. Alternatively, at step 74, the DSA execution module 40 may dispatch instructions to production equipments to perform tool off activities. Also, at step 76, the DSA execution module 40 may control the output volume by dispatching instructions to manufacturing execution system (MES). Furthermore, at step 78, the DSA execution module 40 may force stop in specific steps of soft baking to slow down production. Thus, by performing speed up or slow down steps, the DSA execution module 40 may accomplish speed control of production based on the DSA score.

As discussed above, the DSA score may be calculated on a daily basis. In an illustrative embodiment, the daily DSA score is determined based on two values: POV (j, i) and AOV (j, i). POV (j, i) is a projected output volume (POV) for a part on a specific day, for example, for part i on the jth day. AOV (j, i) is the actual output volume for a part i on the jth day.

Figure 9:
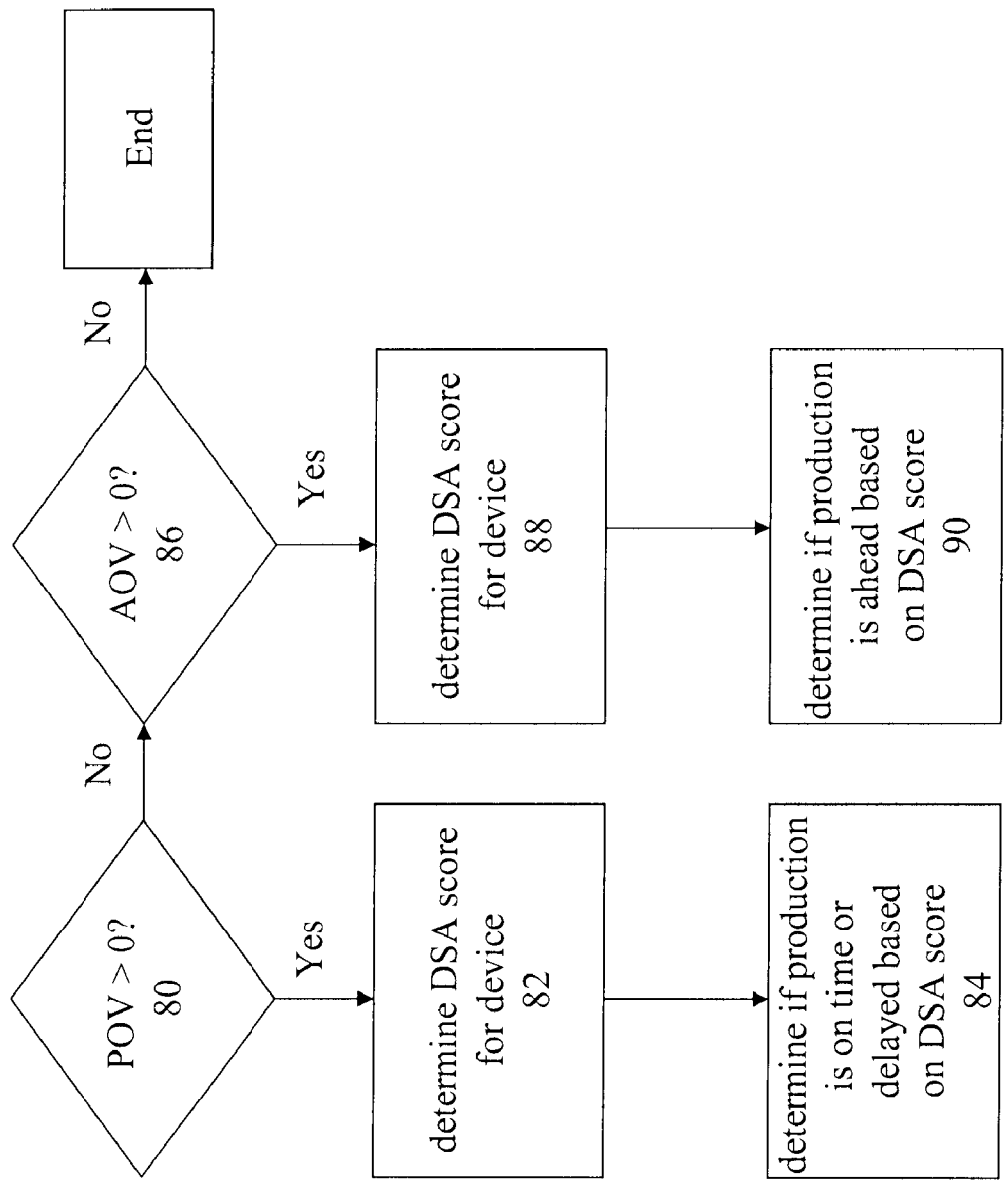
FIG. 9 is flowchart of an exemplary process for determining the daily DSA score.

Referring to FIG. 9, a flowchart of an exemplary process for determining the daily DSA score begins at step 80, where a determination is made as to whether POV (j, i) is greater than zero. If POV (j, i) is greater than zero, a daily DSA score is determined for the device i at step 82. An analysis is made at step 84 as to whether the DSA forecast is on time (within 1 day) or delayed (for 2 or more days) based on the daily DSA score. Turning back to step 80, if POV (j, i) is not greater than zero, a determination is then made at step 86, as to whether AOV (j, i) is greater than zero. If AOV (j, i) is greater than zero, a daily DSA score is determined for the device at step 88. An analysis is made at step 90 as to whether the DSA forecast is ahead (for less than or equal to 2 days) based on the daily DSA score. If AOV (j, i) is not greater than zero, the process terminates.

Figure 10:
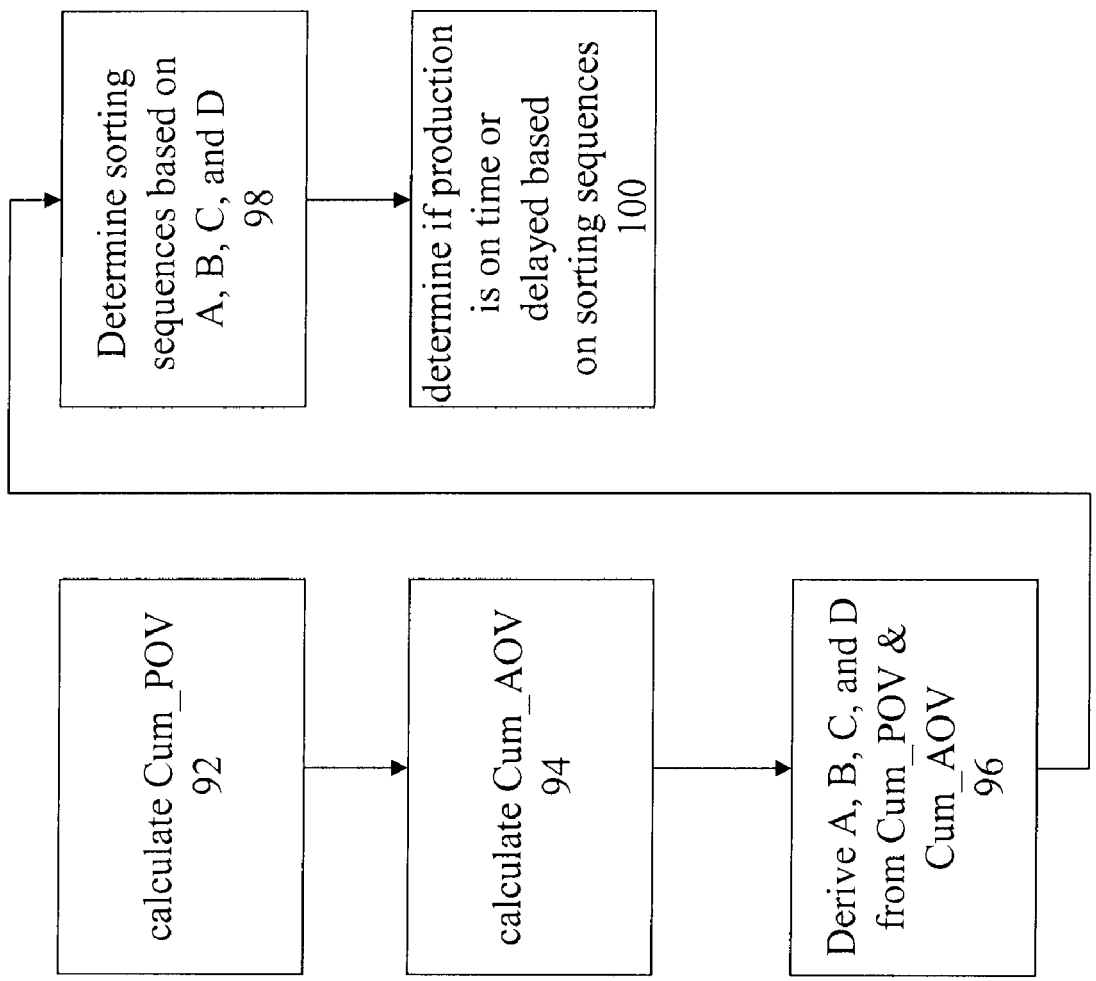
FIG. 10 is a flowchart of an exemplary process for determining a daily DSA score if POV (j, i) is greater than zero and whether the DSA forecast is on time or delayed.

Referring to FIG. 10, a flowchart of an exemplary process for determining a daily DSA score if POV (j, i) is greater than zero and whether the DSA forecast is on time or delayed begins at step 92, where a cum_POV (j, i) is first calculated. Cum_POV (j, i) is a summation of projected output volume (POV) for part i from 1 to jth day. Next, at step 94, a cum_AOV (j, i) is calculated. Cum_AOV (j, i) is a summation of actual output volume (AOV) for part i from 1 to jth day. At step 96, four values A, B, C, and D are derived from cum_POV (j, i) and cum_AOV (j, i). A indicates cum_POV (j−1, i), which represents a cumulative projected output volume for part i up to one day before j. B indicates cum_POV (j, i), which represents a cumulative projected output volume for part i up to jth day. C indicates cum_AOV (j−2, i), which represents a cumulative actual output volume for part i up to two days before j. D indicates cum_AOV (j+1, i), which represents a cumulative actual output volume for part i up to one day after j. At step 98, depending on the values of A, B, C, and D, six sorting sequences are determined. At step 100, based on the sorting sequences, a determination is made as to whether production is on time or delayed.

Figure 11:
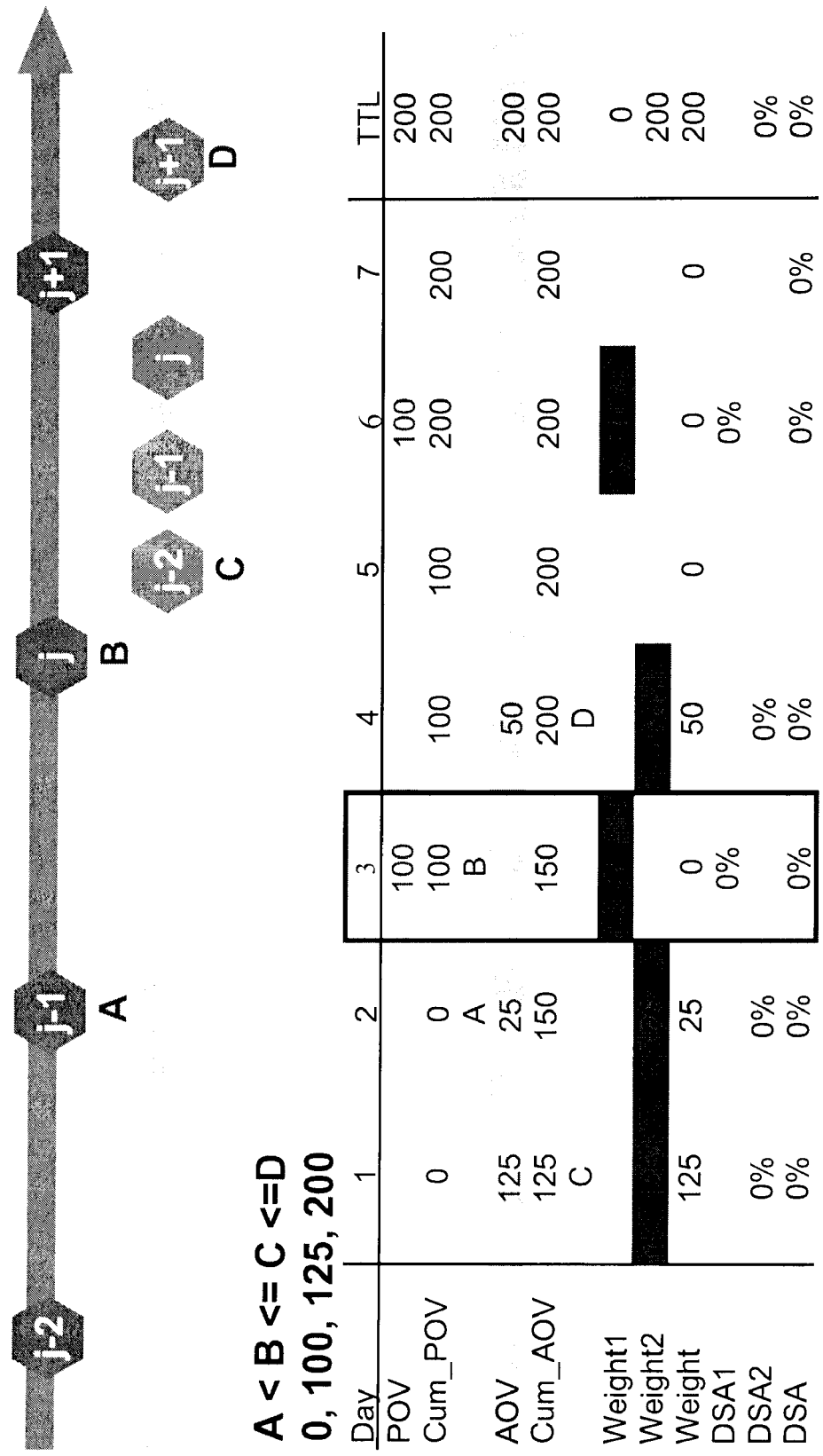
FIG. 11 is a diagram illustrating a first sorting sequence of A, B, C, and D and an exemplary daily DSA score.

Referring to FIG. 11, a diagram illustrating a first sorting sequence of A, B, C, and D and an exemplary daily DSA score is depicted. In this example, A has a value of 0. B has a value of 100. C has a value of 125 and D has a value of 200. Thus, the sorting sequence is A<B<=C<=D. DSA_day_by_part 102 is the DSA score for a specific part i in a specific day j with a ±/−1 day criteria. Weight_day_by_part 104 is the maximum of POV and AOV for the specific part i in the specific day j.

In this case, DSA_day_by_part 102 is 0%, which means that the DSA forecast is ahead two days or more. Weight_day_by_part 104 is also 0%, because there is no need to measure DSA score in the POV>0 scenario. The projected output volume for day 3 is 100 wafers, which has been fulfilled two days ago by the actual output volume of day 1. Therefore, the DSA forecast is 2 days ahead.

Figure 12:
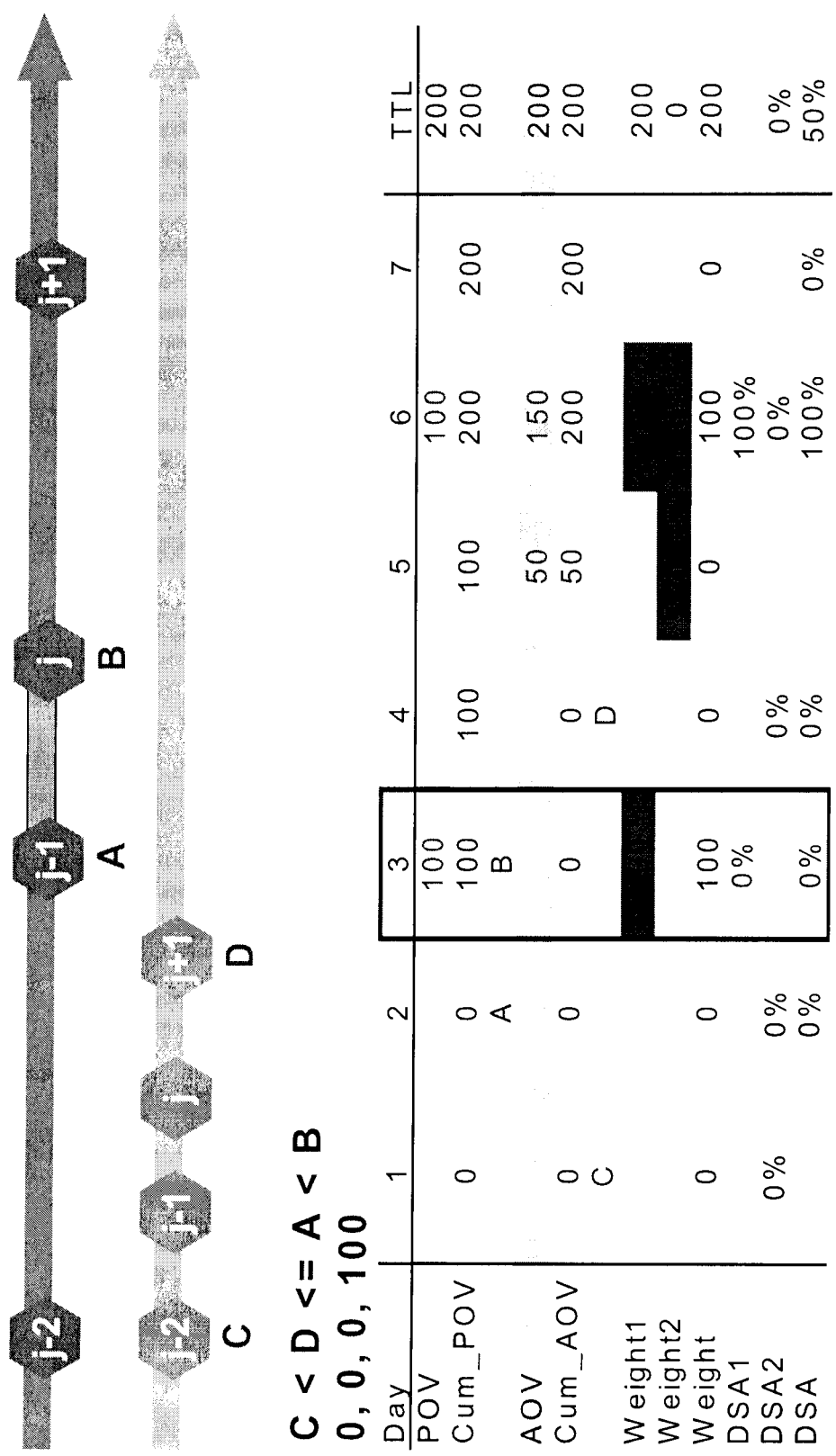
FIG. 12 is a diagram illustrating a second sorting sequence of A, B, C, and D and an exemplary daily DSA score.

Referring to FIG. 12, in this example, A has a value of 0. B has a value of 100. C has a value of 0 and D has a value of 0. Thus, the sorting sequence is C<D<=A<=B. In this case, DSA_day_by_part 106 is 0%, which means that the DSA forecast is ahead two days or more. Weight_day_by_part 108 is equal to the projected output volume (POV) for a specific part i in a specific day j. The projected output volume of day 3 is 100 wafers, which is not fulfilled until day 6. Therefore, the DSA forecast is delayed more than 2 days.

Figure 13:
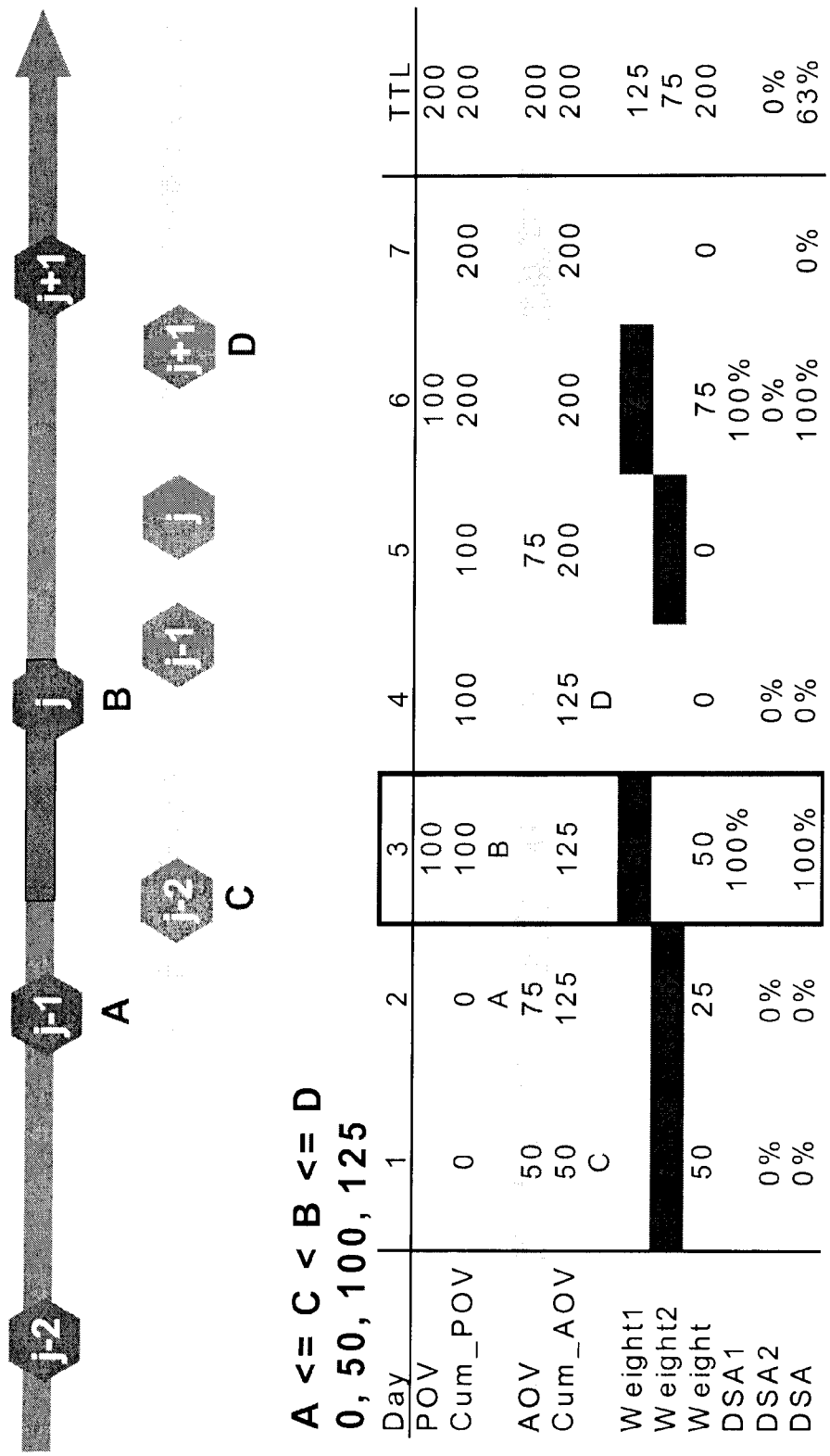
FIG. 13 is a diagram illustrating a third sorting sequence of A, B, C, and D and an exemplary daily DSA score.

Referring to FIG. 13, in this example, A has a value of 0. B has a value of 100. C has a value of 50 and D has a value of 125. Thus, the sorting sequence is A<=C<B<=D. In this case, DSA_day_by_part 110 is 100%, which means that the DSA forecast is on time. Weight_day_by_part 112 is equal to the difference between B and C. The projected output volume of day 3 is 100 wafers, which has been fulfilled by the actual output volume of day 2. Therefore, the DSA forecast is partially on time and partially 2 days ahead.

Figure 14:
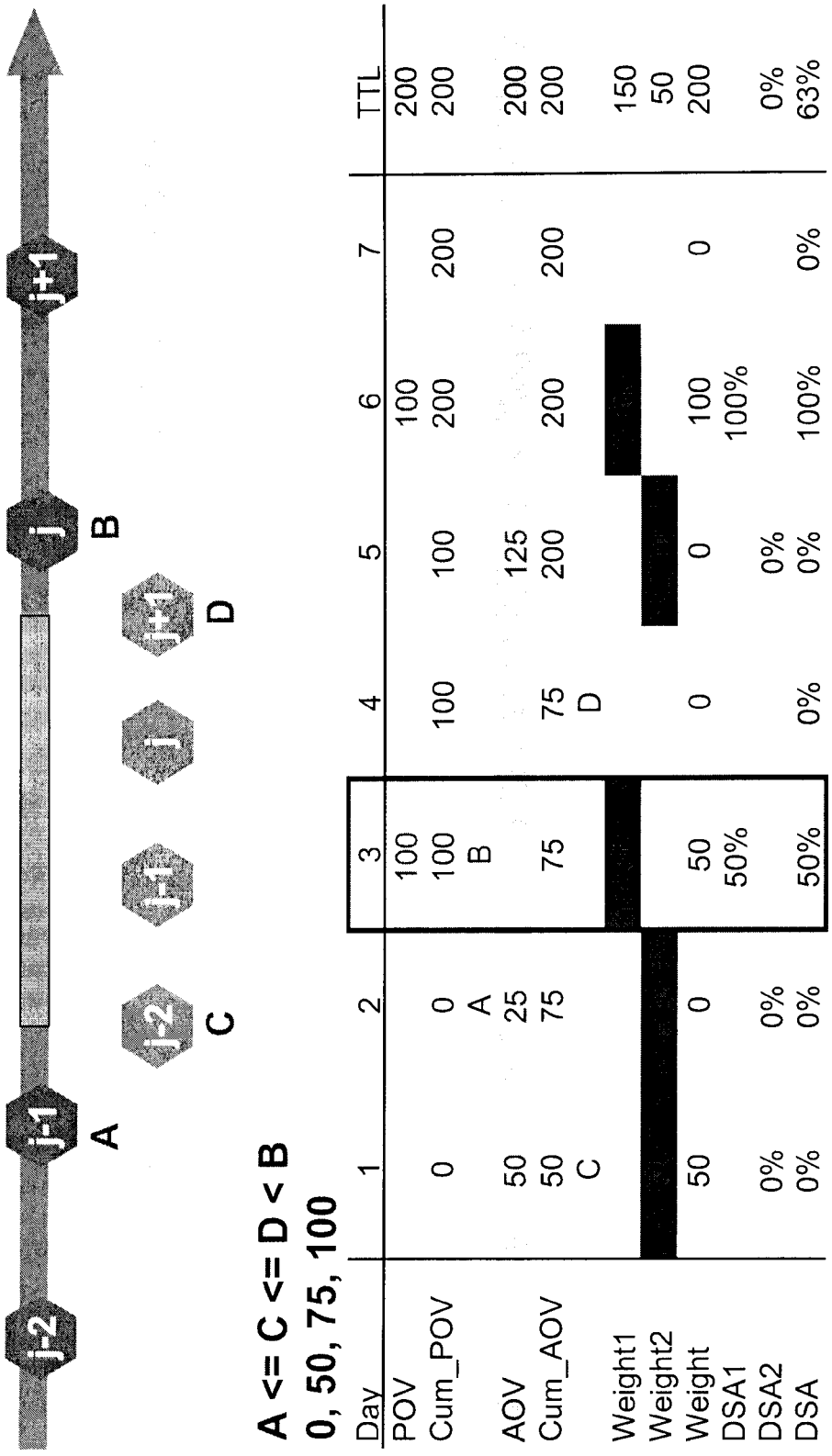
FIG. 14 is a diagram illustrating a fourth sorting sequence of A, B, C, and D and an exemplary daily DSA score.

Referring to FIG. 14, in this example, A has a value of 0. B has a value of 100. C has a value of 50 and D has a value of 75. Thus, the sorting sequence is A<=C<=D<B. In this case, DSA_day_by_part 114 is the (D-C)/(B-C). Weight_day_by_part 116 is equal to the difference between B and C. The projected output volume of day 3 is 100 wafers, which is not fulfilled until day 5. Therefore, the DSA forecast is partially on time, partially delayed 2 days, and partially 2 days ahead.

Figure 15:
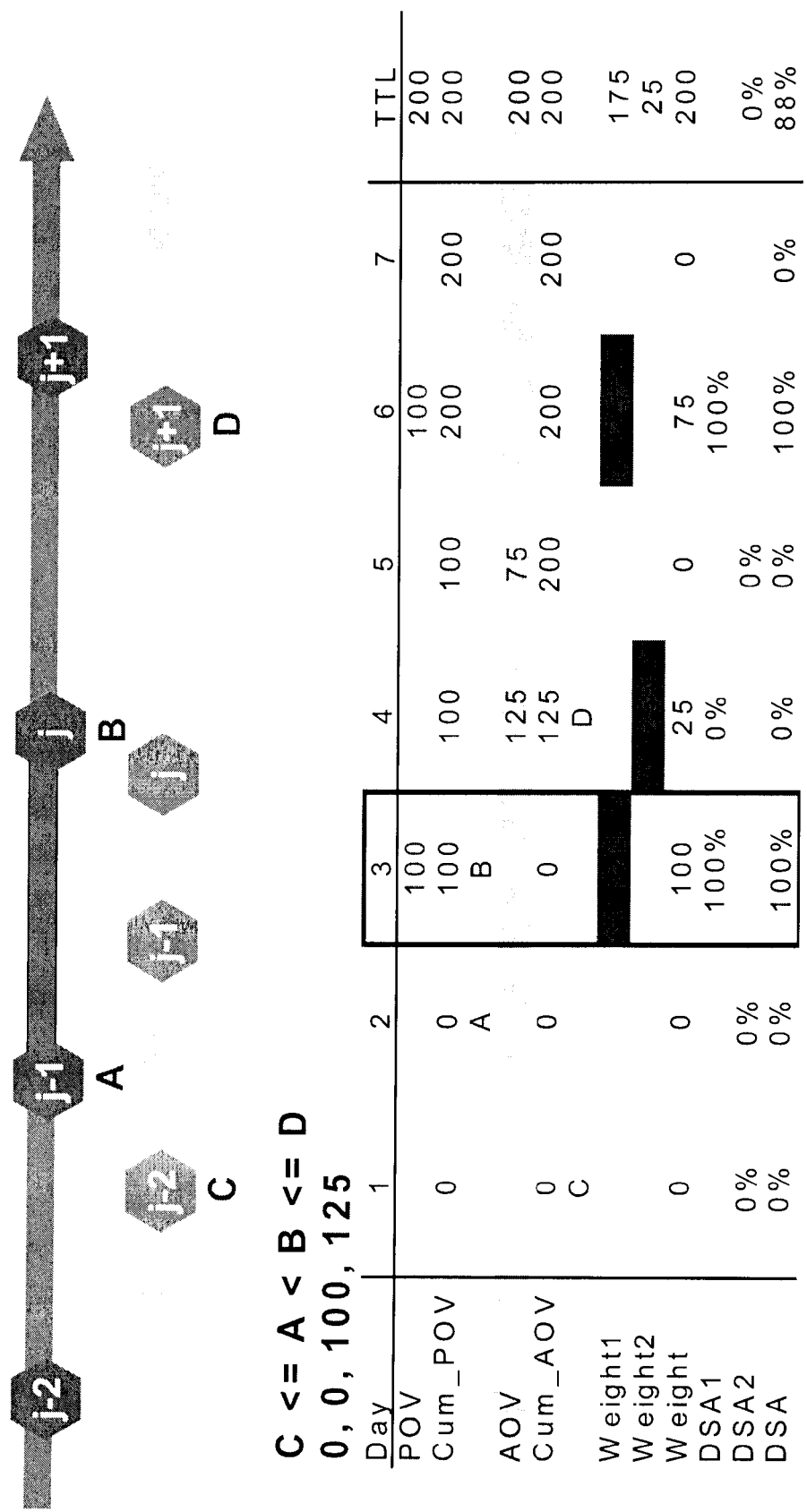
FIG. 15 is a diagram illustrating a fifth sorting sequence of A, B, C, and D and an exemplary daily DSA score.

Referring to FIG. 15, in this example, A has a value of 0. B has a value of 100. C has a value of 0 and D has a value of 125. Thus, the sorting sequence is C<=A<B<=D. In this case, DSA_day_by_part 118 is 100%. Weight_day_by_part 120 is equal to the projected output volume for a specific part i in a specific day j. The projected output volume of day 3 is 100 wafers, which is fulfilled on day 4. Therefore, the DSA forecast is on time.

Figure 16:
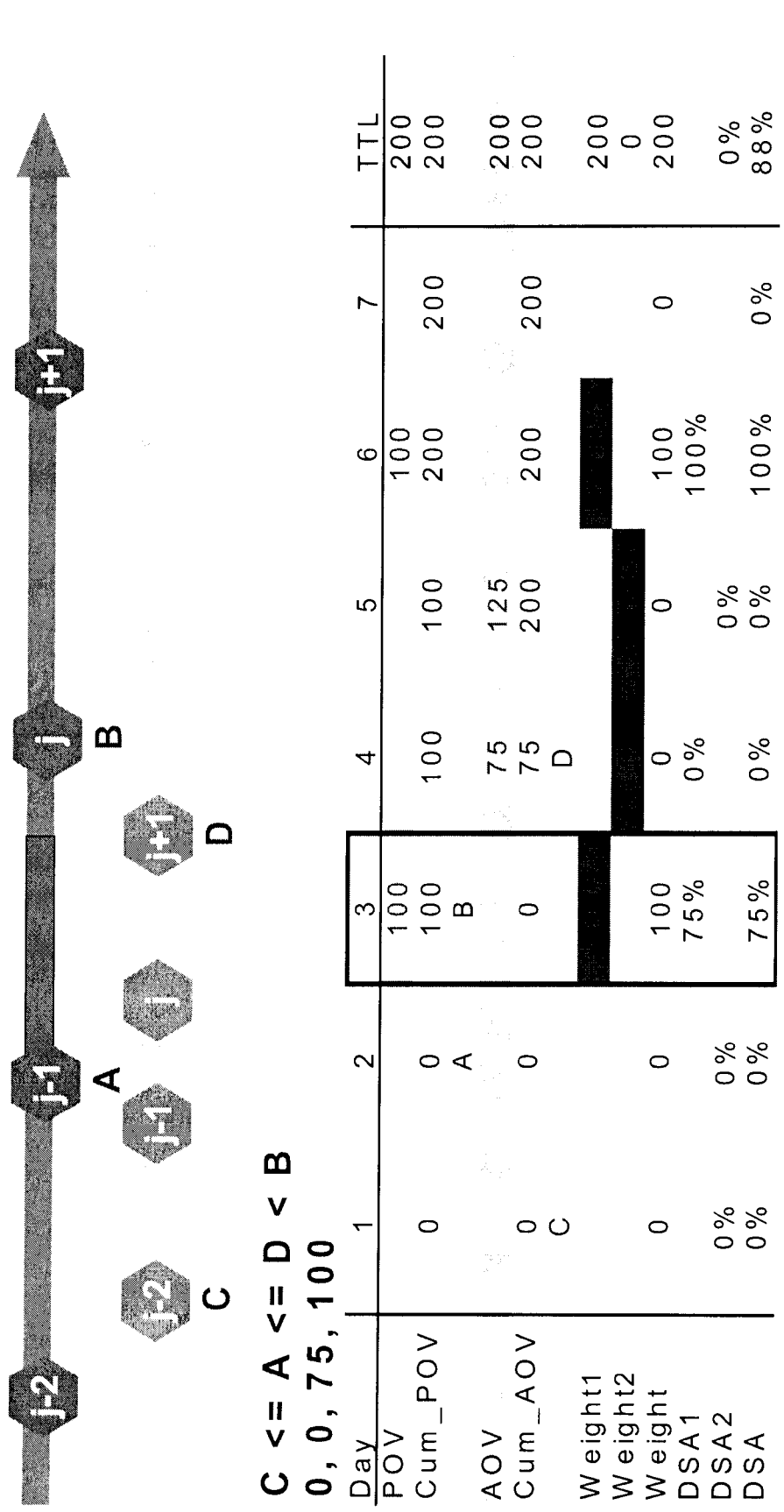
FIG. 16 is a diagram illustrating a sixth sorting sequence of A, B, C, and D and an exemplary daily DSA score.

Referring to FIG. 16, in this example, A has a value of 0. B has a value of 100. C has a value of 0 and D has a value of 75. Thus, the sorting sequence is C<=A<=D<B. In this case, DSA_day_by_part 122 is (D-A)/(B-A). Weight_day_by_part 124 is equal to the projected output volume for a specific part i in a specific day j. The projected output volume of day 3 is 100 wafers, which is not fulfilled until day 5. Therefore, the DSA forecast is partially on time and partially delayed 2 days.

Figure 17:
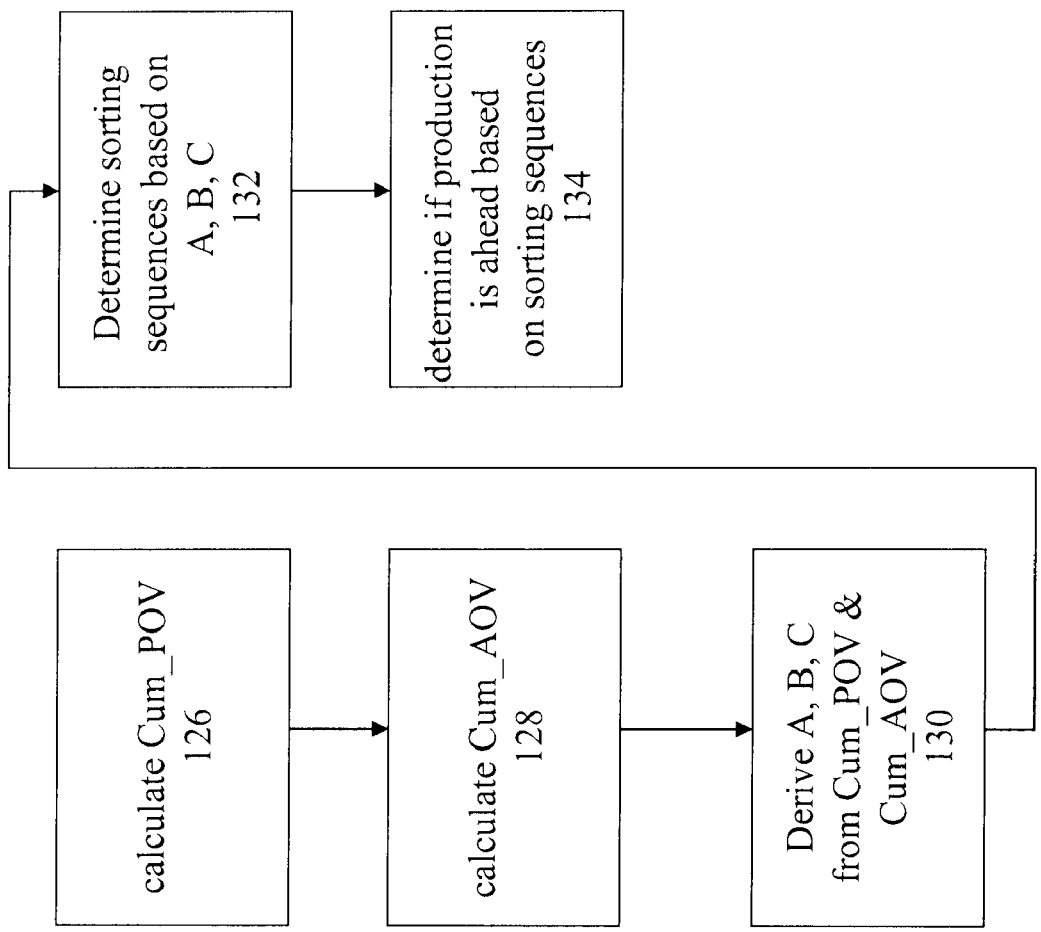
FIG. 17 is a flowchart of an exemplary process for determining a daily DSA score if AOV (j, i) is greater than zero and whether the DSA forecast is ahead.

Referring to FIG. 17, an exemplary process for determining a daily DSA score if AOV (j, i) is greater than zero and whether the DSA forecast is ahead begins at step 126, where a cum_POV (j, i) is first calculated. Cum_POV (j, i) is a summation of projected output volume (POV) for part i from 1 to jth day. Next, at step 128, a cum_AOV (j, i) is calculated. Cum_AOV (j, i) is a summation of actual output volume (POV) for part i from 1 to jth day. At step 130, three values A, B, and C are derived from cum_POV (j, i) and cum_AOV (j, i). A indicates cum_AOV (j−1, i), which represents a cumulative actual output volume for part i up to one day before j. B indicates cum_AOV (j, i), which represents a cumulative actual output volume for part i up to jth day. C indicates cum_POV (j+1, i), which represents a cumulative projected output volume for part i up to one day after j. At step 132, depending on the values of A, B, and C, three sorting sequences are determined. At step 134, based on the sorting sequences, a determination is made as to whether production is ahead.

Figure 18:
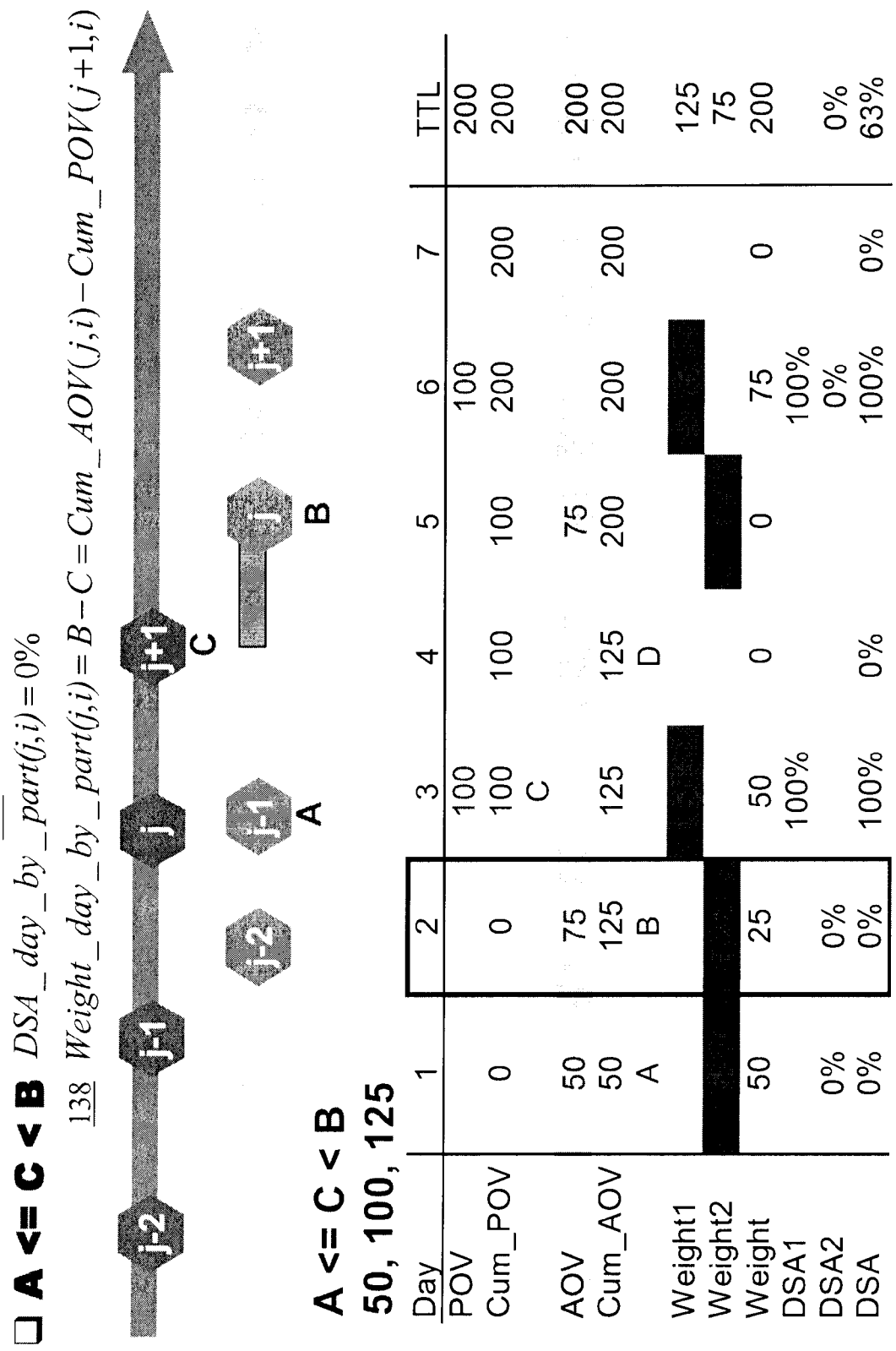
FIG. 18 is a diagram illustrating a seventh sorting sequence of A, B, and C and an exemplary daily DSA score.

Referring to FIG. 18, a diagram illustrating a seventh sorting sequence of A, B, and C and an exemplary daily DSA score is depicted. In this example, A has a value of 50. B has a value of 125. C has a value of 100. Thus, the sorting sequence is A<=C<B. DSA_day_by_part 136 is the DSA score for a specific part i in a specific day j with a ±1 day criteria. Weight_day_by_part 138 is the maximum of POV and AOV for the specific part i in the specific day j. In this case, DSA_day_by_part 86 is 0%, which means that the DSA forecast is delayed two days or less. Weight_day_by_part 88 is also 0%. The projected output volume of day 3 is 100 wafers, of which only 75 wafers are fulfilled on day 2. Therefore, the DSA forecast is partially on time and partially 2 days ahead.

Figure 19:
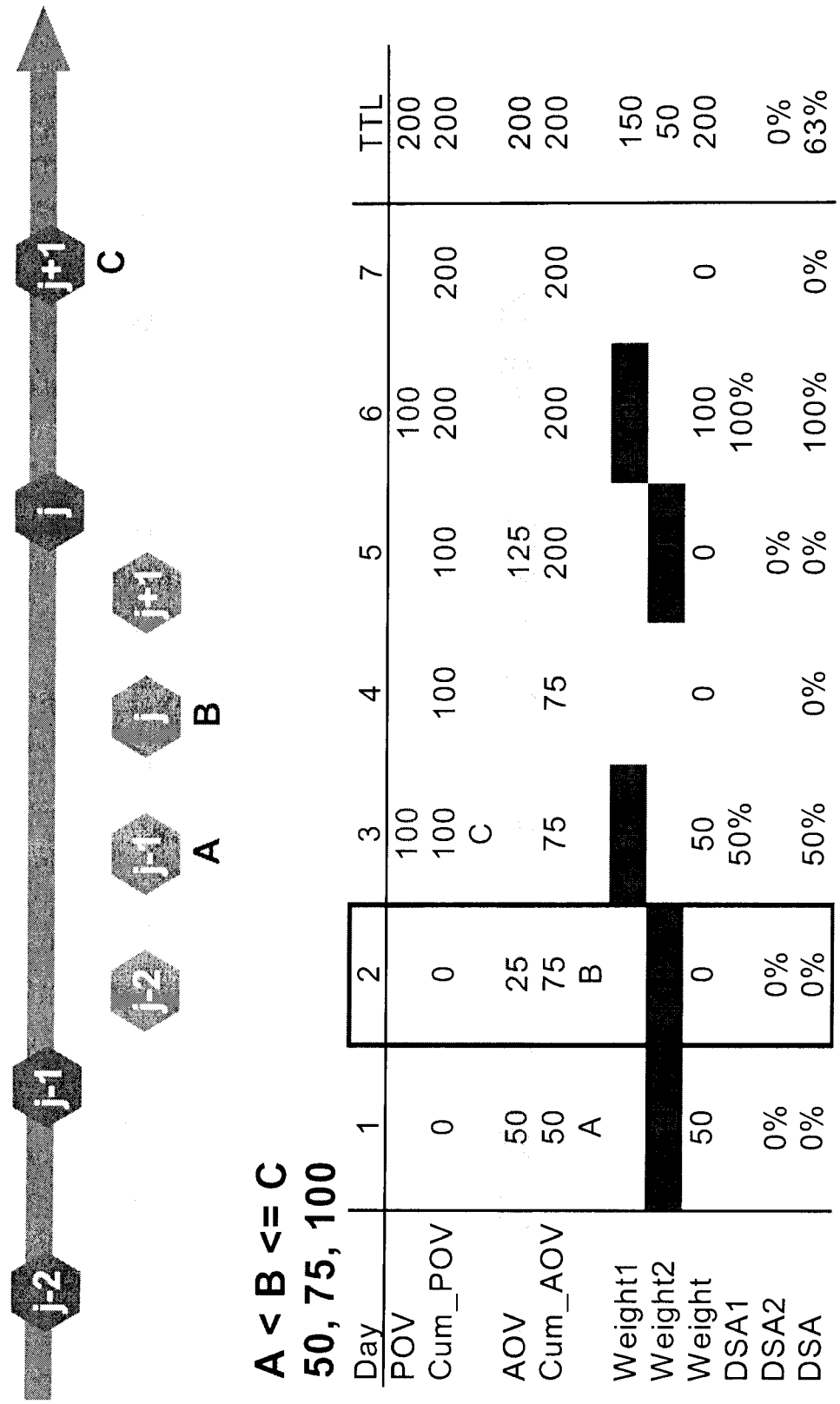
FIG. 19 is a diagram illustrating an eighth sorting sequence of A, B, and C and an exemplary daily DSA score.

Referring to FIG. 19, in this example, A has a value of 50. B has a value of 75. C has a value of 100. Thus, the sorting sequence is A<B<=C. In this case, DSA_day_by_part 140 is 0%, which means that the DSA forecast is delayed two days or less. Weight_day_by_part 142 is equal to the difference between B and C. The projected output volume of day 3 is 100 wafers, which has been fulfilled by actual output volume of day 2. Therefore, the DSA forecast is on time.

Figure 20:
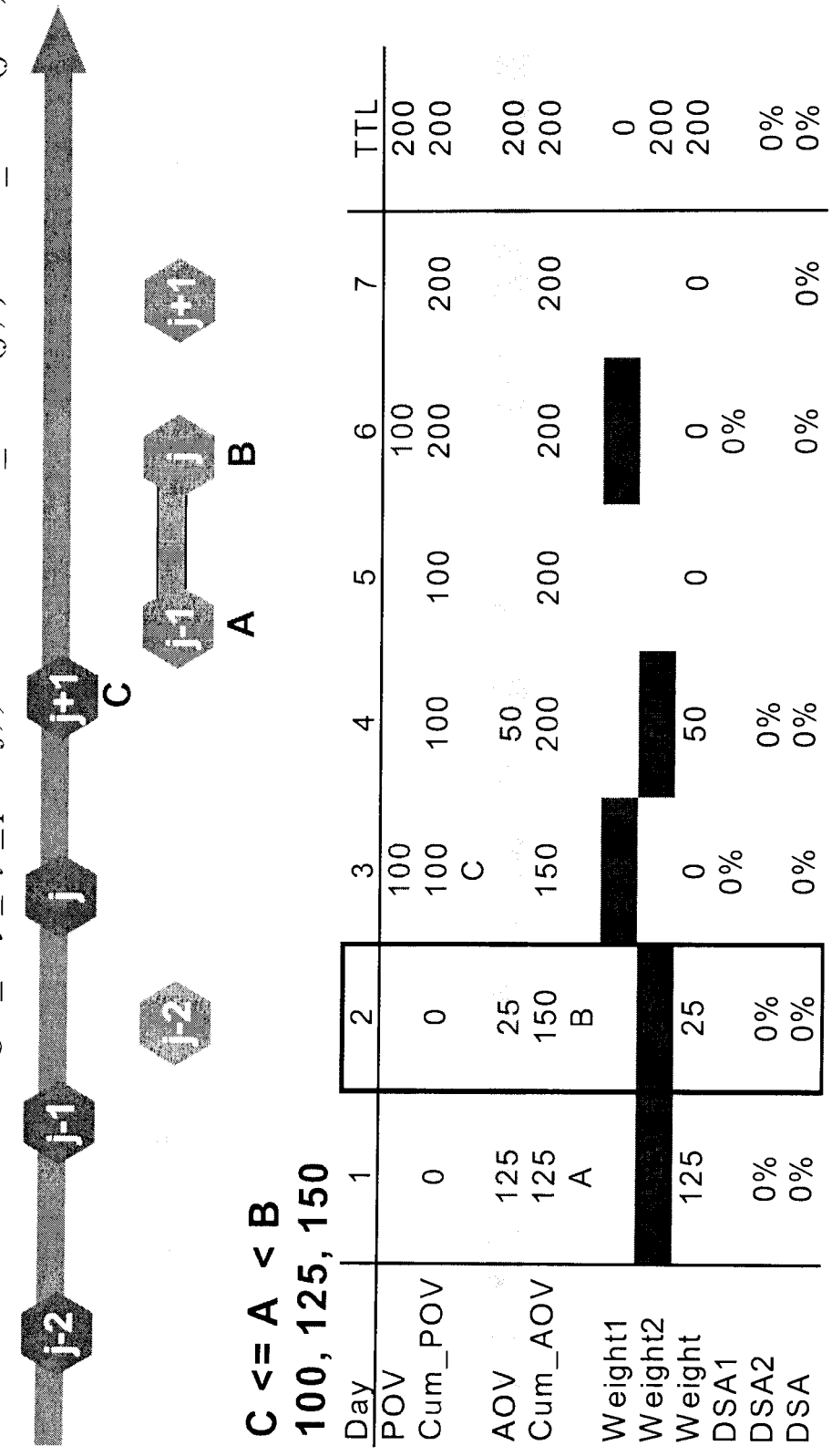
FIG. 20 is a diagram illustrating a ninth sorting sequence of A, B, and C and an exemplary daily DSA score.

Referring to FIG. 20, in this example, A has a value of 125. B has a value of 150. C has a value of 100. Thus, the sorting sequence is C<=A<B. In this case, DSA_day_by_part 144 is 0%, which means that the DSA forecast is delayed two days or less. Weight_day_by_part 146 is equal to the difference between B and A. The projected output volume of day 3 is 100 wafers, which has been fulfilled by actual output volume of day 1. Therefore, the DSA forecast is 2 days ahead.

In summary, aspects of the present disclosure provide a method and system for measuring customer delivery service accurately and provides early communication to customers. By generating the projected output date on a daily basis, more accurate delivery schedule may be provided to the customers. With a more accurate output date, the customers may reduce their inventory and capacity costs. By providing a DSA score on a weekly or daily basis, production control department may adjust production volume accordingly to meet the projected output date and reduce outsource costs.

It is to be understood that the following disclosure provides different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not itself dictate a relationship between various embodiments and/or configurations discussed.

What is claimed is:

1. A method for measuring customer service delivery, the method comprising:
   generating a projected customer delivery date;
   determining at least one projected output volume based on the projected customer delivery date;
   determining at least one actual output volume; and
   determining accuracy of the projected customer delivery date based on the at least one projected output volume and the at least one actual output volume, wherein said determining accuracy comprises:
   determining a weekly delivery schedule accuracy score for each device in a plurality of devices; and
   determining an overall weekly delivery schedule accuracy score for the plurality of devices.

2. The method of claim 1, wherein generating a projected customer delivery date comprises:
   retrieving a master production schedule from manufacturing planners;
   generating a daily operation plan based on the master production schedule;
   identifying capabilities of manufacturing facilities; and
   generating the projected customer delivery date based on the daily operation plan and the capabilities of the manufacturing facilities.

3. The method of claim 1, further comprising:
automatically notifying a customer of the projected customer delivery date.

4. The method of claim 1, wherein determining a weekly delivery schedule accuracy score for each device in a plurality of devices comprises:
determining a minimum of a projected output volume per week and an actual output volume per week for a device; and
dividing the minimum by a maximum of the projected output volume per week and the actual output volume per week for the device to form the weekly delivery schedule accuracy score.

5. The method of claim 1, wherein determining an overall weekly delivery schedule accuracy score for the plurality of devices comprises:
determining a summation of minimums of projected output volume and actual output volume of the plurality of devices;
determining a summation of maximums of projected output volume and actual output volume of the plurality of devices; and
dividing the summation of minimums by the summation of the maximums to form the overall weekly delivery schedule accuracy score.

6. A method for measuring customer service delivery, the method comprising:
generating a projected customer delivery date;
determining at least one projected output volume based on the projected customer delivery date;
determining at least one actual output volume; and
determining accuracy of the projected customer delivery date based on the at least one projected output volume and the at least one actual output volume, wherein said determining accuracy comprises;
determining if the at least one projected output volume is greater than zero;
determining a daily delivery schedule accuracy score for a device if the at least one projected output volume is greater than zero; and
determining if production is on time or delayed based on the daily delivery schedule accuracy score.

7. The method of claim 6, wherein determining a daily delivery schedule accuracy score for a device comprises:
determining a cumulative projected output volume for the device up to one day before a selected day to form a first cumulative projected output volume;
determining a cumulative projected output volume for the device up to the selected day to form a second cumulative projected output volume;
determining a cumulative actual output volume for the device up to two days before the selected day to form a first cumulative actual output volume; and
determining a cumulative actual output volume for the device up to one day after the selected day to form a second cumulative projected output volume.

8. The method of claim 7, further comprising:
determining the daily delivery schedule accuracy score for the device based on a sorting sequence of the first cumulative projected output volume, the second cumulative projected output volume, the first cumulative actual output volume, and the second cumulative projected output volume.

9. A method for measuring customer service delivery, the method comprising:
generating a projected customer delivery date;
determining at least one projected output volume based on the projected customer delivery date;
determining at least one actual output volume; and
determining accuracy of the projected customer delivery date based on the at least one projected output volume and the at least one actual output volume, wherein said determining accuracy comprises;
determining if the at least one actual output volume is greater than zero;
determining a daily delivery schedule accuracy score for a device if the at least one actual output volume is greater than zero; and
determining if production is ahead based on the daily delivery schedule accuracy score.

10. The method of claim 9, wherein determining a daily delivery schedule accuracy score for a device comprises:
determining a cumulative actual output volume for the device up to one day before a selected day to form a first cumulative actual output volume;
determining a cumulative actual output volume for the device up to the selected day to form a second cumulative actual output volume; and
determining a cumulative projected output volume for the device up to one day after the selected day.

11. The method of claim 10, further comprising:
determining the daily delivery schedule accuracy score for the device based on a sorting sequence of the first cumulative actual output volume, the second cumulative actual output volume, and the cumulative projected output volume.

12. The method of claim 1, further comprising:
determining whether to speed up or slow down production based on the accuracy of the projected customer delivery date; and
performing a step to speed up or slow down production.

13. The method of claim 12, wherein the step to speed up production is at least one of upgrading priority using an automatic priority setting mechanism, enhancing production capacity, and speeding up hand carry operations.

14. The method of claim 12, wherein the step to slow down production is at least of downgrading priority using an automatic priority setting mechanism, dispatching instructions to production equipments to perform tool off activities, controlling outputs, and forcing stop in specific steps of soft baking.

15. A system for measuring customer delivery schedule comprising:
a generation module for generating a projected customer delivery date;
a first determining module for determining at least one projected output volume based on the projected customer delivery date;
a second determining module for determining at least one actual output volume; and
a third determining module for determining accuracy of the projected customer delivery date based on the at least one projected output volume and the at least one actual output volume, wherein said determining accuracy comprises: determining a weekly delivery schedule accuracy score for each device in a plurality of devices; and determining an overall weekly delivery schedule accuracy score for the plurality of devices.

16. The system of claim 15, further comprising:
a reviewing module for reviewing the accuracy of the projected customer delivery date; and an execution module for speeding up or slowing down production based on the accuracy of the projected customer delivery date.

17. The system of claim 15, further comprising:

a notification module for automatically notifying a customer of the projected customer delivery date.

18. A computer-readable medium having encoded thereon a process comprising:

generating a projected customer delivery date;

determining at least one projected output volume based on the projected customer delivery date;

determining at least one actual output volume; and determining accuracy of the projected customer delivery date based on the at least one projected output volume and the at least one actual output volume, wherein said determining accuracy comprises:

determining a weekly delivery schedule accuracy score for each device in a plurality of devices; and determining an overall weekly delivery schedule accuracy score for the plurality of devices.

19. The computer-readable medium of claim 18, having encoded thereon a process further comprising:

automatically notifying a customer of the projected customer delivery date.

* * * * *